(12) United States Patent
Kowalczyk et al.

(10) Patent No.: US 12,530,223 B2
(45) Date of Patent: Jan. 20, 2026

(54) DYNAMIC SUPPORT CONTAINERS FOR CONTAINERIZED APPLICATIONS

(71) Applicant: International Business Machines Corporation, Armonk, NY (US)

(72) Inventors: Szymon Kowalczyk, Malopolska (PL); Piotr P. Godowski, Cracow (PL); Michal Paluch, Malopolskie (PL); Andrzej Pietrzak, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 17/502,340

(22) Filed: Oct. 15, 2021

(65) Prior Publication Data

US 2023/0121475 A1   Apr. 20, 2023

(51) Int. Cl.
*G06F 9/46*   (2006.01)
*G06F 9/455*   (2018.01)
(Continued)

(52) U.S. Cl.
CPC ............. *G06F 9/485* (2013.01); *G06F 9/461* (2013.01); *G06F 9/50* (2013.01)

(58) Field of Classification Search
CPC . G06F 9/485; G06F 9/461; G06F 9/50; G06F 9/4856; G06F 9/4862; G06F 9/4875; G06F 9/5005; G06F 9/5044; G06F 9/505; G06F 9/5055; G06F 9/5088; G06F 9/45554; G06F 9/45558; G06F 2009/45562; G06F 2009/4556; G06F 2009/45575
See application file for complete search history.

(56) References Cited

U.S. PATENT DOCUMENTS 7,209,437 B1 *   4/2007   Hodgkinson ............. H04L 9/40
                                                    709/225
8,495,613 B2 *   7/2013   Smith ....................... G06F 8/65
                                                    717/176
(Continued)

FOREIGN PATENT DOCUMENTS

CN   111290767 A   6/2020
CN   111552496 A   8/2020
(Continued)

*Primary Examiner* — April Y Blair
*Assistant Examiner* — Zhi Chen
(74) *Attorney, Agent, or Firm* — CHIP LAW GROUP

(57) ABSTRACT

A computer system provides dynamic support containers for containerized applications. A pod is instantiated comprising one or more containers and a sidecar container, wherein execution of the sidecar container is temporarily suspended after initialization. It is determined that a container of the one or more containers requires additional computing resources. In response to determining that the container requires additional computing resources, execution of the sidecar container is resumed and the sidecar container is provided with instructions to perform a computing task of the container. In response to determining that the computing task is complete, execution of the sidecar container is suspended. Embodiments of the present invention further include a method and program product for providing dynamic support containers for containerized applications in substantially the same manner described above.

12 Claims, 7 Drawing Sheets

(51) Int. Cl.
*G06F 9/48* (2006.01)
*G06F 9/50* (2006.01)

(56) References Cited

U.S. PATENT DOCUMENTS

| | | | | |
|---|---|---|---|---|
| 9,112,769 | B1* | 8/2015 | Fitzgerald | H04L 41/0896 |
| 11,892,418 | B1* | 2/2024 | Featonby | G06F 8/71 |
| 2004/0210796 | A1* | 10/2004 | Largman | G06F 11/1469 |
| | | | | 714/E11.133 |
| 2005/0160424 | A1* | 7/2005 | Broussard | G06F 9/5088 |
| | | | | 718/1 |
| 2007/0055423 | A1* | 3/2007 | Yoshida | B60R 11/0264 |
| | | | | 701/36 |
| 2007/0074182 | A1* | 3/2007 | Hinchey | G06F 8/10 |
| | | | | 717/136 |
| 2008/0140529 | A1* | 6/2008 | Agarwal | G06Q 30/0267 |
| | | | | 705/14.54 |
| 2008/0209022 | A1* | 8/2008 | Swank | H04L 41/042 |
| | | | | 709/223 |
| 2010/0100888 | A1* | 4/2010 | Tene | G06F 9/5077 |
| | | | | 714/6.32 |
| 2012/0266156 | A1* | 10/2012 | Spivak | G06F 8/65 |
| | | | | 717/172 |
| 2013/0061220 | A1* | 3/2013 | Gnanasambandam | |
| | | | | G06F 9/5088 |
| | | | | 718/1 |
| 2014/0059392 | A1* | 2/2014 | Ren | G06F 11/1484 |
| | | | | 714/47.1 |
| 2019/0391841 | A1* | 12/2019 | Mullen | G06F 9/485 |
| 2020/0026850 | A1* | 1/2020 | Levin | G06F 9/45558 |
| 2020/0028911 | A1* | 1/2020 | Sun | G06F 3/065 |
| 2020/0133789 | A1* | 4/2020 | Natanzon | G06F 16/2365 |
| 2020/0272488 | A1* | 8/2020 | Strode, Jr. | H04L 41/0806 |
| 2020/0296189 | A1* | 9/2020 | Lee | H04L 67/02 |
| 2020/0356397 | A1 | 11/2020 | Kumatagi et al. | |
| 2020/0356400 | A1* | 11/2020 | Pashenkov | G06F 9/547 |
| 2020/0394062 | A1* | 12/2020 | Thomas | G06F 9/455 |
| 2021/0311764 | A1* | 10/2021 | Rosoff | G06F 9/44505 |
| 2022/0300296 | A1* | 9/2022 | Sharma | G06F 9/4498 |

FOREIGN PATENT DOCUMENTS

| | | | | |
|---|---|---|---|---|
| CN | 112130923 A | * | 12/2020 | G06F 9/44505 |
| CN | 112506617 A | | 3/2021 | |
| CN | 115981777 A | | 4/2023 | |
| EP | 3163812 B1 | * | 10/2018 | H04L 45/64 |
| JP | 2023-059832 A | | 4/2023 | |

* cited by examiner

DYNAMIC SUPPORT CONTAINERS FOR CONTAINERIZED APPLICATIONS

BACKGROUND

1. Technical Field

Present invention embodiments relate to cloud computing and virtualization, and more specifically, to dynamic support containers for containerized applications.

2. Discussion of the Related Art

Operating system-level virtualization is a computing paradigm in which a kernel supports the existence of multiple isolated instances called containers. A containerized application refers to an application that can be distributed across multiple containers, with each container performing specific tasks. In the context of cloud computing, containerized applications tend to reduce the hardware requirements of servers because sharing an operating system kernel across containers reduces the number of individual operating systems that need to be supported. Additionally, containerized applications are scalable, as multiple instances of an application can be instantiated on demand. However, while scalability can be achieved by providing multiple instances of an application, scaling within an application itself can be difficult to achieve.

SUMMARY

According to one embodiment of the present invention, a computer system provides dynamic support containers for containerized applications. A pod is instantiated comprising one or more containers and a sidecar container, wherein execution of the sidecar container is temporarily suspended after initialization. It is determined that a container of the one or more containers requires additional computing resources. In response to determining that the container requires additional computing resources, execution of the sidecar container is resumed and the sidecar container is provided with instructions to perform a computing task of the container. In response to determining that the computing task is complete, execution of the sidecar container is suspended. Embodiments of the present invention further include a method and program product for providing dynamic support containers for containerized applications in substantially the same manner described above.

Accordingly, present invention embodiments provide the benefit of reducing the amount of computing resources utilized by containerized applications, thereby improving their efficiency. In some embodiments, the sidecar container is suspended by saving a state of the sidecar container. Thus, the sidecar container can resume execution based on the same state in which the sidecar container was previously suspended. In some embodiments, the computing task is selected from a group of: a report generation task, a backup task, a log transfer task, a user-initiated task, and an optimization task. Thus, particular tasks can be defined or identified that will be offloaded to the sidecar container, enabling main containers to commit resources to their assigned tasks. In some embodiments, the sidecar container executes a script to perform the computing task, and the script includes instructions to suspend the sidecar container in response to completing the computing task. Thus, the sidecar container will automatically suspend execution when the sidecar container is not needed. In some embodiments, an amount of computing resources is reserved to make the computing resources available to the sidecar container when execution of the sidecar container is resumed. By reserving computing resources, present invention embodiments ensure that the sidecar container can resume execution. In some embodiments, the reserved amount of computing resources is used to perform low-priority actions while execution of the sidecar container is suspended, and the low-priority actions are interrupted when execution of the sidecar container is resumed. Thus, the reserved resources can actually be used for other tasks, thereby increasing the efficiency of the containerized applications. In some embodiments, a liveness probe is used to verify that execution of the sidecar container is suspended. The liveness probe can confirm that a sidecar container is suspended, and if not, actions can be taken to suspend the sidecar container.

BRIEF DESCRIPTION OF THE DRAWINGS

Generally, like reference numerals in the various figures are utilized to designate like components.

DETAILED DESCRIPTION

Figure 1:
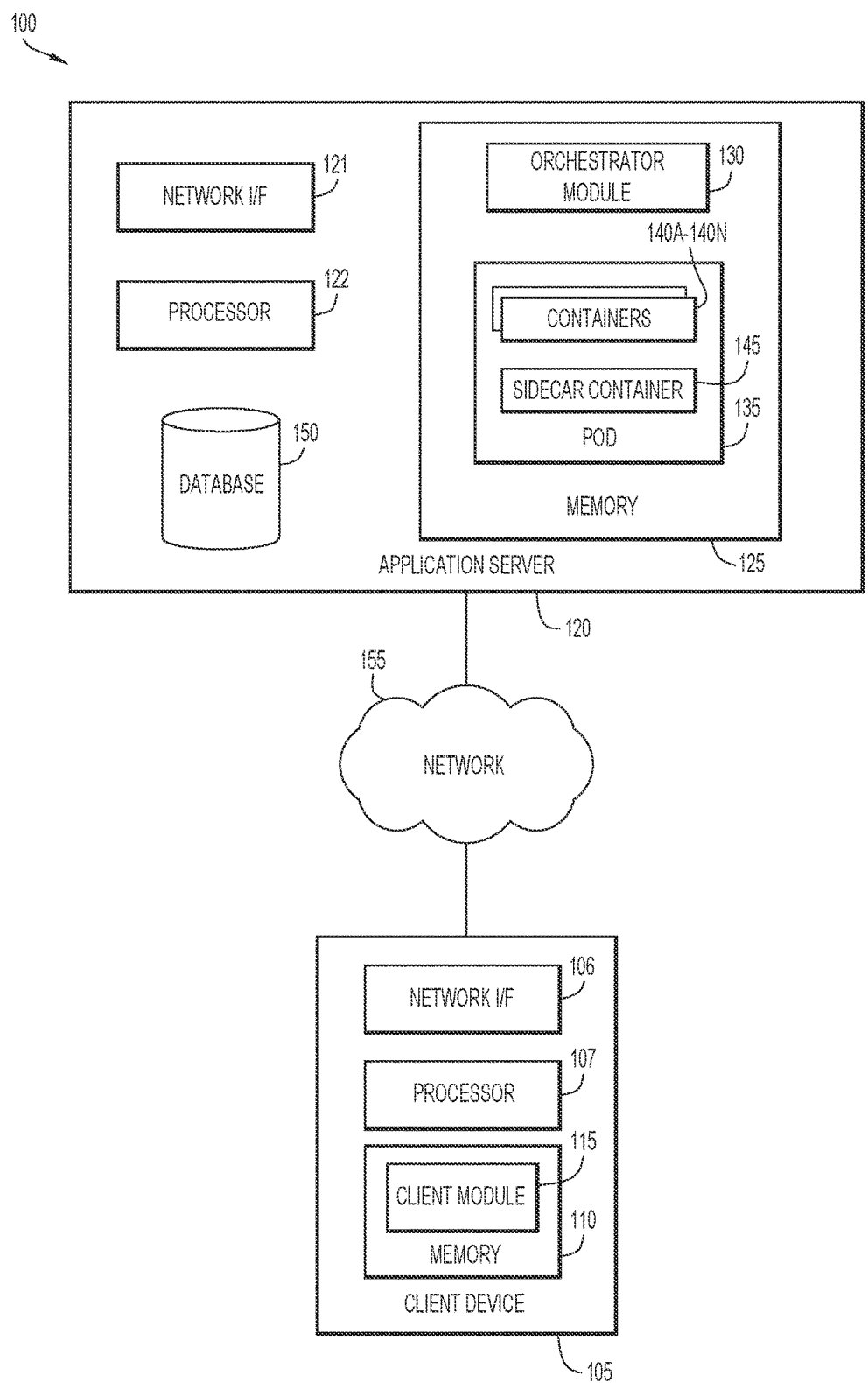
FIG. 1 is a block diagram depicting a computing environment for a containerized application in accordance with an embodiment of the present invention.

Present invention embodiments relate to cloud computing and virtualization, and more specifically, to dynamic support containers for containerized applications. A containerized application is typically administrated by a container orchestration system, which controls the configuration, deployment, execution, and other management aspects of containerized applications. A container orchestration system, or orchestrator, may launch a containerized application by instantiating the composite containers from stored images.

Some container orchestrators, such as Kubernetes, make distinctions between types of containers. Typically, there are "main" containers that are designed to focus on a particular task (or set of tasks), and support containers, also referred to as "sidecar" containers, which are coupled to main containers and can perform supplemental tasks to support the other containers. A pod refers to a group of main containers, and optionally, one or more sidecar containers, that function cohesively as an application. When some set of conditions are met, a main container can offload a task to a sidecar container, thus enabling the main container to continue to dedicate resources toward its intended task while the sidecar container handles the assigned operations. However, sidecar containers consume computing resources throughout runtime, despite not being used during much of a containerized application's execution.

Accordingly, present invention embodiments provide dynamic sidecar containers that can be suspended when not necessary, thus providing the practical application of reducing the computing resources (e.g., processing resources, memory resources, network resources, etc.) used by a containerized application. In contrast to conventional sidecar containers, dynamic sidecar containers only consume system resources during actual use, thus increasing the overall efficiency of containerized applications. Additionally, since fewer sidecar containers are active at any given moment for a grouping of containerized applications, a customer's total number of licenses in concurrent use is reduced, thus enabling the same results to be achieved without requiring the purchase of additional licenses. Furthermore, present invention embodiments can reserve computing resources for dynamic sidecar containers to ensure that the resources are available when a dynamic sidecar container is required again. Computing resources can be reserved in a manner that enables other computing and/or networking tasks to be performed while still maintaining the system resources for usage by the dynamic sidecar container when necessary. Thus, the embodiments presented herein improve the field of virtualization and cloud computing by increasing the efficiency of containerized applications and reducing the overall computing resource requirements of containerized applications.

In some embodiments, the sidecar container is suspended by saving a state of the sidecar container. Thus, the sidecar container can resume execution based on the same state in which the sidecar container was previously suspended. In some embodiments, the computing task is selected from a group of: a report generation task, a backup task, a log transfer task, a user-initiated task, and an optimization task. Thus, particular tasks can be defined or identified that will be offloaded to the sidecar container, enabling main containers to commit resources to their assigned tasks. In some embodiments, the sidecar container executes a script to perform the computing task, and the script includes instructions to suspend the sidecar container in response to completing the computing task. Thus, the sidecar container will automatically suspend execution when the sidecar container is not needed. In some embodiments, an amount of computing resources is reserved to make the computing resources available to the sidecar container when execution of the sidecar container is resumed. By reserving computing resources, present invention embodiments ensure that the sidecar container can resume execution. In some embodiments, the reserved amount of computing resources is used to perform low-priority actions while execution of the sidecar container is suspended, and the low-priority actions are interrupted when execution of the sidecar container is resumed. Thus, the reserved resources can actually be used for other tasks, thereby increasing the efficiency of the containerized applications. In some embodiments, a liveness probe is used to verify that execution of the sidecar container is suspended. The liveness probe can confirm that a sidecar container is suspended, and if not, actions can be taken to suspend the sidecar container.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for a containerized application in accordance with an embodiment of the present invention. As depicted, computing environment 100 includes a client device 105, an application server 120, and a network 155. It is to be understood that the functional division among components of computing environment 100 have been chosen for purposes of explaining present invention embodiments and is not to be construed as a limiting example.

Client device 105 includes a network interface (I/F) 106, at least one processor 107, and a memory 110. Memory 110 may include a client module 115. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 155. In general, client device 105 enables an end user to access servers, such as application server 120, in order to perform computing tasks like designing containerized applications, modifying containerized applications, executing containerized applications, and the like. Client device 105 may include internal and external hardware components, as depicted and described in further detail with respect to FIG. 5.

Client module 115 may include one or more modules or units to perform various functions of present invention embodiments described below. Client module 115 may be implemented by any combination of any quantity of software and/or hardware modules or units, and may reside within memory 110 of client device 105 for execution by a processor, such as processor 107.

Client module 115 enables a user to access application server 120 in order to perform operations relating to containerized applications. In some embodiments, client module 115 enables a user to upload or select virtualization images for containers (e.g., indicating states of software and/or hardware, etc.) that will be included in a containerized application. In some embodiments, client module 115 transmits commands, based on user input, to cause settings or configurations of a containerized application to be modified. Additionally or alternatively, client module 115 may transmit instructions to cause a containerized application to be instantiated, to cause a containerized application to perform a particular computing task, and the like. In some embodiments, client module 115 enables a user to specify certain instructions or tasks that should be performed by main containers (e.g., containers 140A-140N) and/or sidecar containers (e.g., sidecar container 145).

Application server 120 includes a network interface (I/F) 121, at least one processor 122, memory 125, and a database 150. Memory 125 may include an orchestrator module 130, and a pod 135 that includes one or more containers 140A-140N and at least one sidecar container 145. Application server 120 may include a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 121 enables components of application server 120 to send and receive data over a network, such as network 155. In general, application server 120 hosts containerized applications by storing images of containers (e.g., indicating states of software and/or hardware, etc.), instantiating containers, supporting the execution of containers, and any other functions necessary to support containerized applications. In some embodiments, application server 120 is a cloud computing server that provides on-demand computing power without necessarily relying on direct active management by an end user. Application server 120 may include internal and external hardware components, as depicted and described in further detail with respect to FIG. 5.

Orchestrator module 130, pod 135, containers 140A-140N, and sidecar container 145 may include one or more modules or units to perform various functions of present invention embodiments described below. Orchestrator module 130, pod 135, containers 140A-140N, and sidecar container 145 may be implemented by any combination of any quantity of software and/or hardware modules or units, and may reside within memory 125 of application server 120 for execution by a processor, such as processor 122.

Orchestrator module 130 may be an orchestration system for containerized applications that performs conventional or other orchestration tasks, such as automating deployment, scaling, and operations of containerized applications. In some embodiments, orchestrator module 130 manages images of containerized application by storing the images in one or more databases (e.g., database 150). Orchestrator module 130 can instantiate image files to create containers that can, alone or in combination, constitute a containerized application.

Orchestrator module 130 may orchestrate containerized applications based on instructions received from client applications, such as client module 115 of client device 105. Orchestrator module 130 may instantiate containerized applications, pass instructions from client module 115 to containerized applications, and terminate containerized applications. Orchestrator module 130 may suspend or resume the execution of sidecar container 145 in accordance with present invention embodiments.

While a containerized application can be achieved using a single container, multiple-container applications may also be managed by orchestrator module 130. In particular, orchestrator module 130 may organize, manage, and/or control execution of multiple containers in a grouping referred to as a pod. A pod can correspond to a single containerized application. In the depicted embodiment, pod 135 includes one or more containers 140A-140N and at least one sidecar container 145; in various embodiments, orchestrator module 130 may orchestrate one or more pods simultaneously.

Pod 135 may be a basic scheduling unit that provides a grouping of containerized components. Pod 135 may include one or more containers, such as containers 140A-140N and sidecar container 145. Pod 135 may provide a level of organization over containers, as each pod can be assigned its own Internet Protocol (IP) address, and pod 135 may access local disk directories or network disks on behalf of hosted containers. In some embodiments, pod 135 corresponds to a stand-alone containerized application that is managed by orchestrator module 130.

Containers 140A-140N may each perform some tasks or combination of tasks to support execution of a containerized application. For example, one container may perform database queries, another container may process data, and another container may write results of processing to a database. Further included in pod 135 is sidecar container 145, which covers event-based high load tasks. Based on the design of a containerized application, orchestrator module 130 provides tasks to sidecar container 145 when certain conditions are met, such as a data backup occurring, a user requesting a particular processing job, or a report being generated.

Unlike containers 140A-140N, which persist in memory 125 during runtime of the application associated with pod 135, sidecar container 145 may be suspended when not performing computing tasks in order to free up computing resources. Orchestrator module 130 may suspend sidecar container 145 by obtaining a state of sidecar container 145 during execution and saving the state to a persistent storage, such as database 150. Thus, the space in memory 125 occupied by sidecar container 145 may be freed, and network interface 121 and processor 122 likewise no longer have to support sidecar container 145 when sidecar container 145 is not necessary.

Database 150 may include any non-volatile storage media known in the art. For example, database 150 can be implemented with a tape library, optical library, one or more independent hard disk drives, or multiple hard disk drives in a redundant array of independent disks (RAID). Similarly, data in database 150 may conform to any suitable storage architecture known in the art, such as a file, a relational database, an object-oriented database, and/or one or more tables. In some embodiments, database 150 may store data corresponding to containerized applications, including image files for containers, pod descriptions (e.g., descriptions of which containers are included in a pod), data stored by, generated by, or otherwise used by containerized applications, state data corresponding to suspended sidecar containers, and the like.

Network 155 may include a local area network (LAN), a wide area network (WAN) such as the Internet, or a combination of the two, and includes wired, wireless, or fiber optic connections. In general, network 155 can be any combination of connections and protocols known in the art that will support communications between client device 105 and application server 120 via their respective network interfaces in accordance with embodiments of the present invention.

Figure 2A:
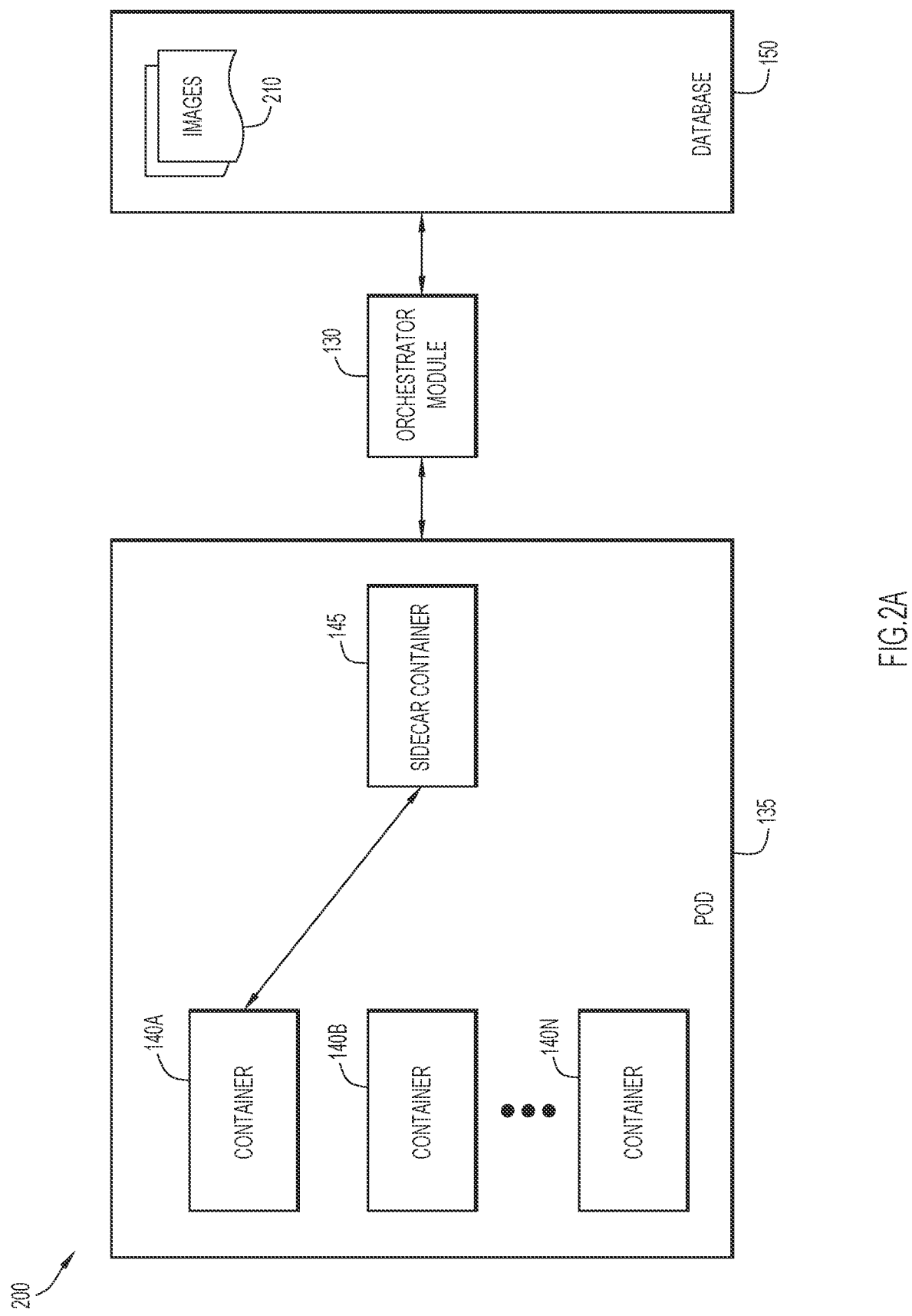
FIGS. 2A-2C are block diagrams depicting a runtime environment in accordance with an embodiment of the present invention.
Figure 2B:
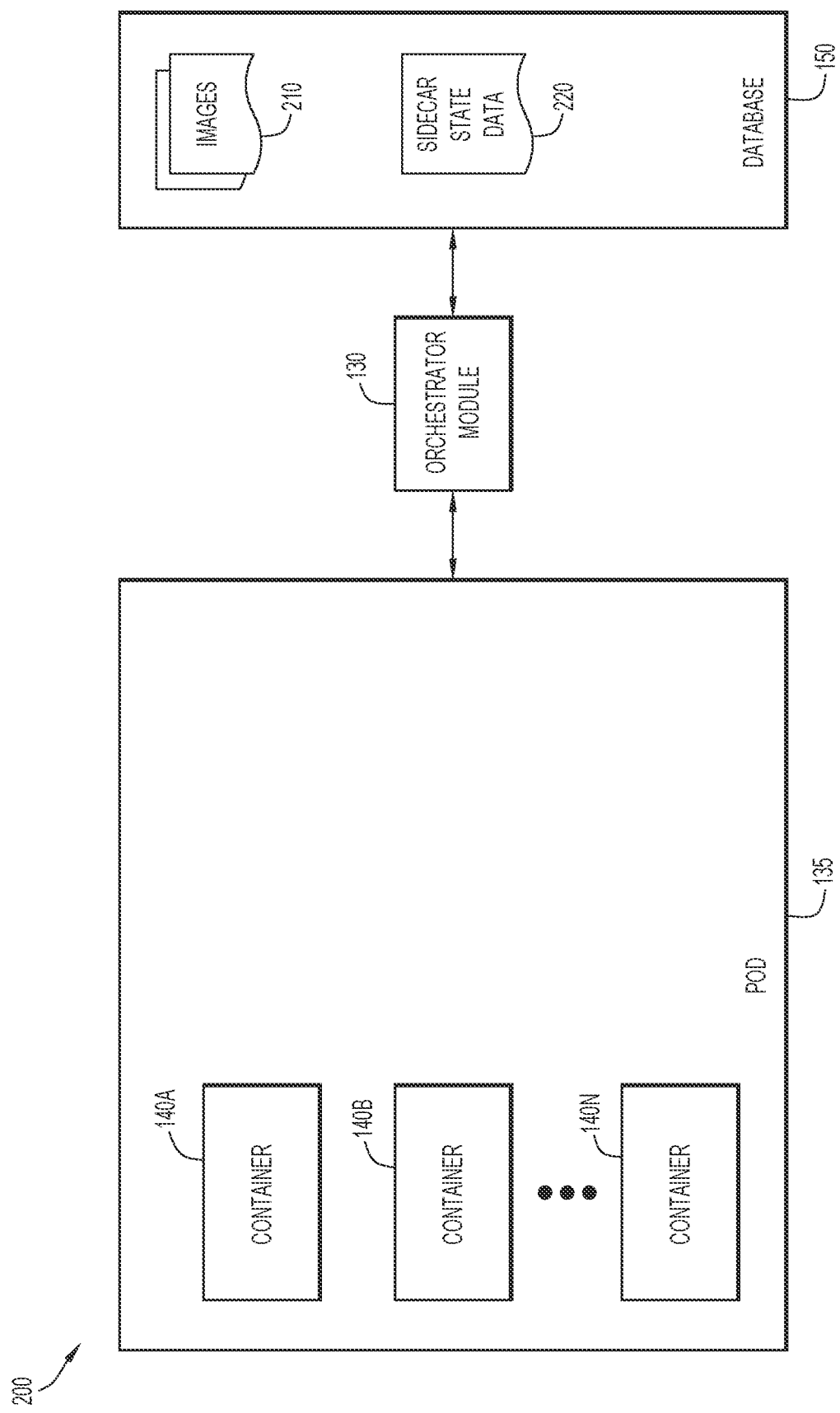
Figure 2C:
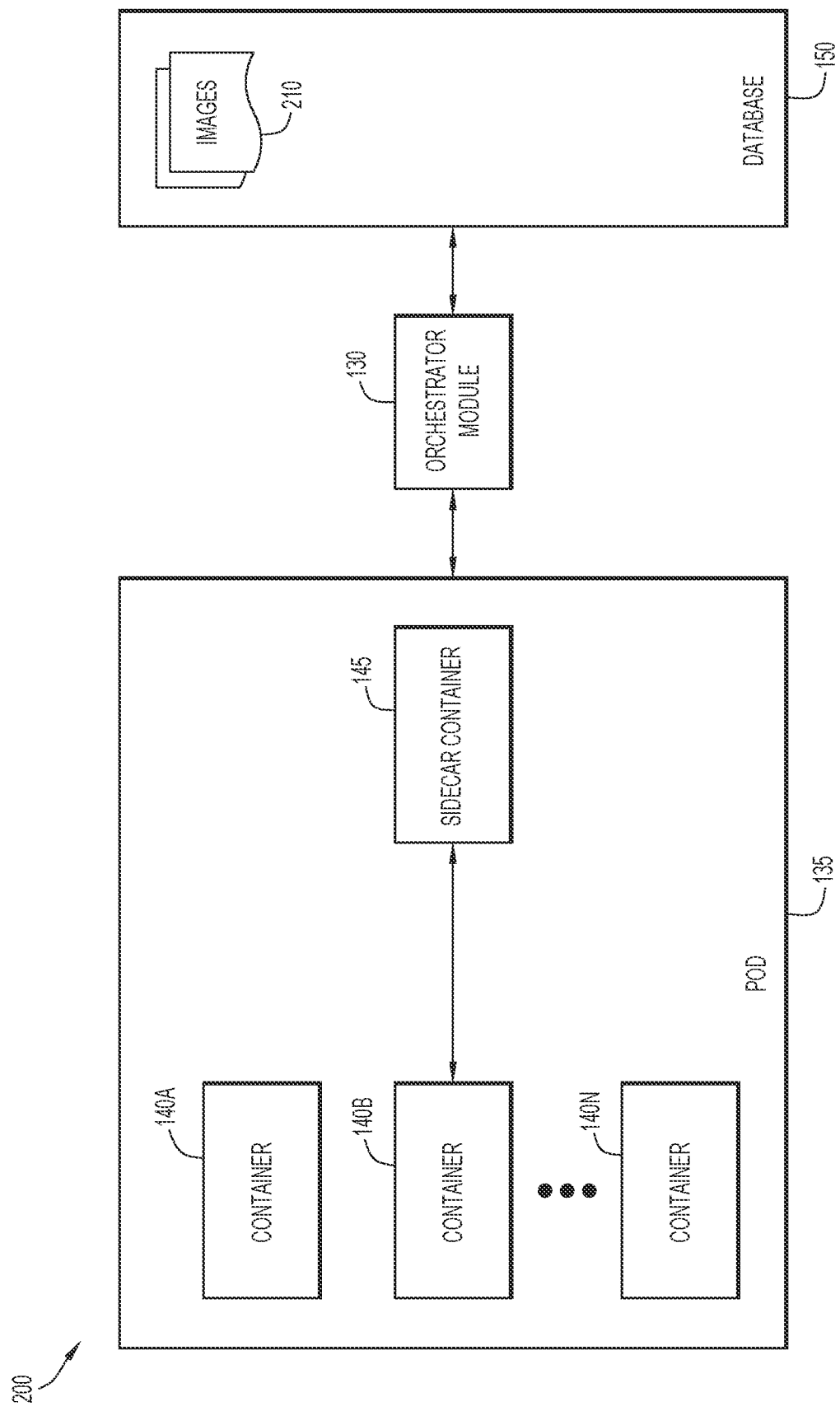

FIGS. 2A-2C are block diagrams depicting a runtime environment 200 in accordance with an embodiment of the present invention. As depicted, FIGS. 2A-2C illustrate a same containerized application at different times of execution.

As shown in FIG. 2A, runtime environment 200 includes a pod 135, as well as orchestrator module 130 and database 150. Pod 135 includes containers 140A-140N and a sidecar container 145. Database 150 stores images 210, which are the executable data files from which orchestrator module 130 instantiates pod 135 and its contents (i.e., containers 140A-140C and sidecar container 145). At the time of execution depicted in FIG. 2A, container 140A has offloaded a computing task to sidecar container 145.

With reference now to FIG. 2B, runtime environment 200 is depicted at a time in which there is no computing task being performed by a sidecar. Accordingly, orchestrator module 130 suspends execution of sidecar container 145, and saves the state of sidecar container 145 to database 150 as sidecar state data 220. Thus, there is no sidecar container currently encapsulated by pod 135 at the time of execution depicted in FIG. 2B. Orchestrator module 130 may reserve computing resources for sidecar container 145 when sidecar container 145 is suspended such that the computing resources necessary for execution of sidecar container 145 are available when sidecar container 145 is resumed. In some embodiments, orchestrator module 130 may make available the reserved computing resources to low-priority tasks that can be interrupted, such as background computing tasks. Additionally or alternatively, the reserved computing resources can be used for a data backup task, a data analysis task, a data cleansing task, an error-checking task, an indexing task, and the like.

With reference now to FIG. 2C, runtime environment 200 is depicted at a time in which another container, container 140B, has encountered a condition that requires offloading of a computing task. Accordingly, orchestrator module 130 resumes execution of sidecar container 145 using the saved state data in database 150. In the depicted embodiment, sidecar state data 220 has been purged from database 150 after resuming executing of sidecar container 145; however, in some embodiments, sidecar state data 220 may be retained temporarily or permanently.

Figure 3:
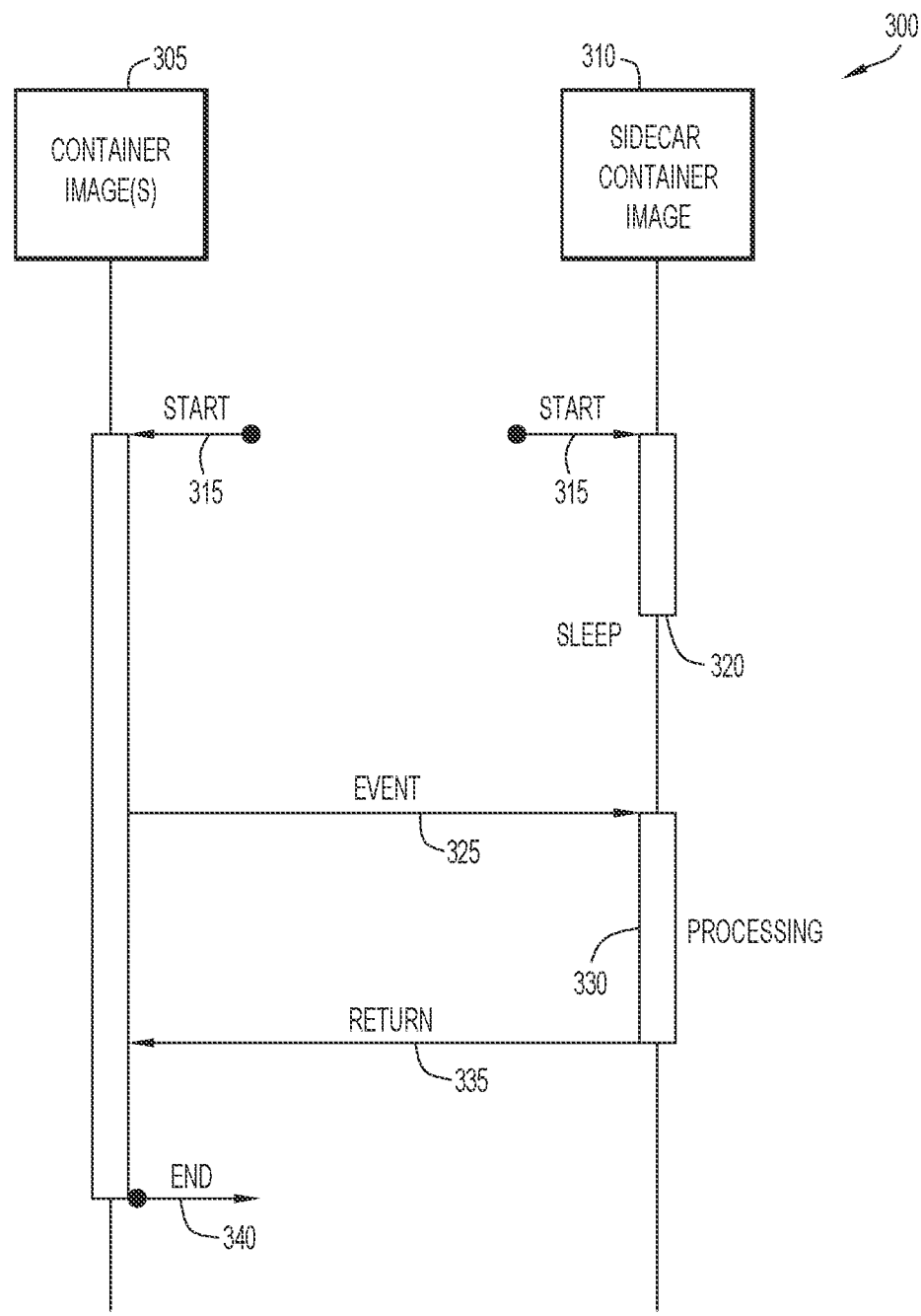
FIG. 3 is a block diagram depicting an execution timeline in accordance with an embodiment of the present invention.

FIG. 3 is a block diagram depicting an execution timeline 300 in accordance with an embodiment of the present invention. Initially, one or more container images 305 and sidecar container image 310 are used to instantiate a corresponding one or more containers and sidecar container at operation 315. After instantiating the sidecar container, the sidecar container may initialize and perform other startup actions, and then may suspend execution (e.g., "sleep") at operation 320. In contrast, the one or more containers continue executing to provide a containerized application.

The containerized application may encounter a particular condition at event 325 in which one of the containers requires offloading of a computing task to a sidecar container. In response, the sidecar container may resume execution and perform processing at operation 330.

When processing is completed, the sidecar container may return the results at operation 335. In some embodiments, a sidecar container includes a script that executes to perform a desired computing task, and the script ends by executing instructions to cause the sidecar container to return the results and to suspend execution. Thus, a sidecar container may automatically suspend execution at the completion of any task. The script may further cause the sidecar container to transmit instructions to an orchestrator to cause the orchestrator to save a state of the sidecar container. After the results are returned at operation 335, the containerized application itself may perform additional computing tasks and, when completed, terminate at operation 340.

Figure 4:
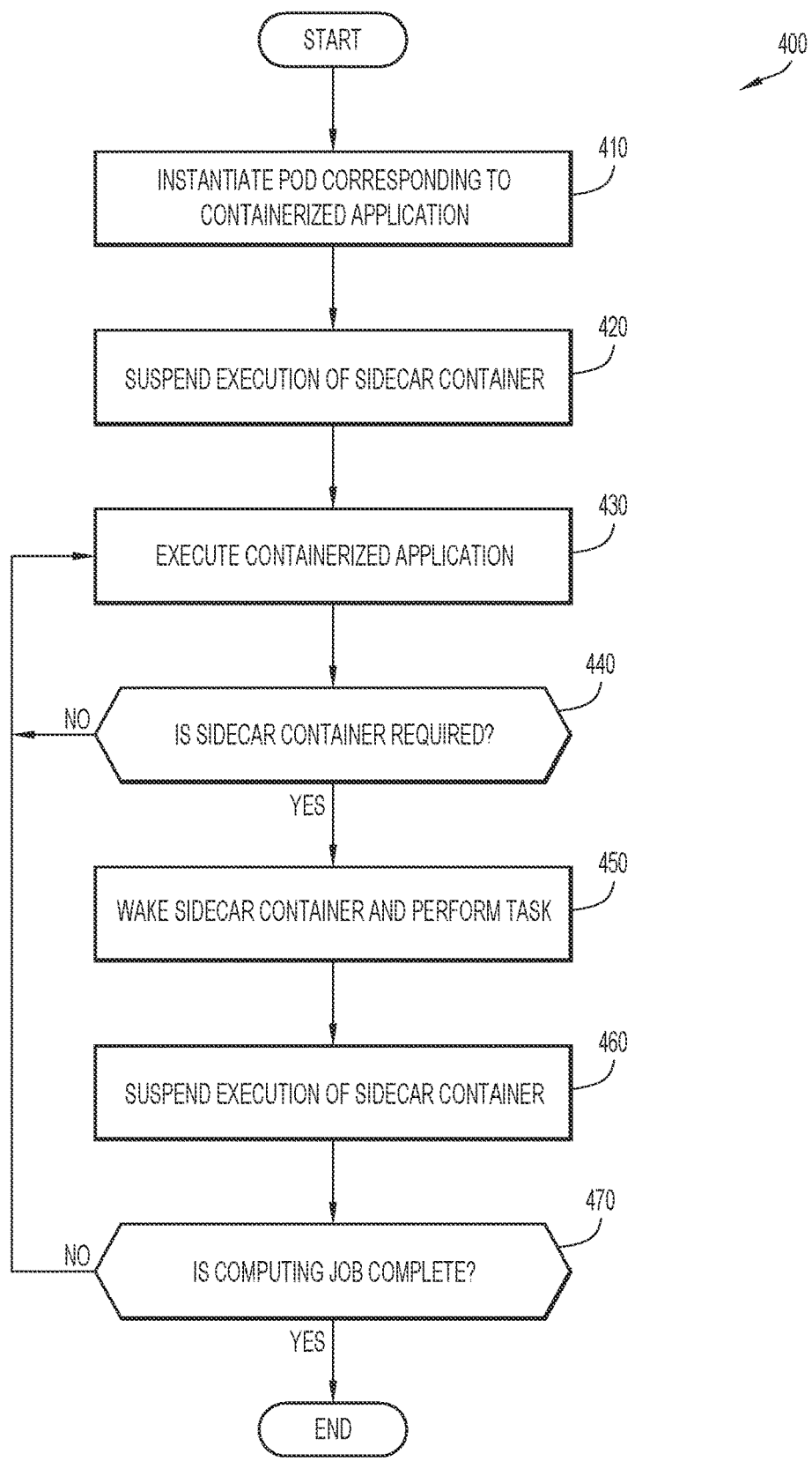
FIG. 4 is a flow chart depicting a method of providing a containerized application in accordance with an embodiment of the present invention.

FIG. 4 is a flow chart depicting a method 400 of providing a containerized application in accordance with an embodiment of the present invention.

A pod corresponding to a containerized application is instantiated at operation 410. A container orchestration system, such as orchestrator module 130, may instantiate a pod based on a description of the pod that includes the images of the constituent containers of the pod. Each image file may be identified and instantiated to provide a running pod that includes one or more containers and a sidecar container. In some embodiments, the container orchestration system is a Kubernetes orchestrator, and the containers can be instantiated using any images, such as Docker images. The pod may include one or more specialized containers, referred to as "init" containers, that run before application containers in a pod to perform setup and other initialization operations.

Execution of the sidecar container is suspended at operation 420. Initially, the sidecar container may be instantiated along with the other containers of a pod. Thus, for example, an orchestrator can check to ensure that the pod can execute at full capacity. At some point after the sidecar container is instantiated, the sidecar container may suspend execution, and the orchestrator can save the state of the sidecar container to persistent storage (e.g., database 150).

The containerized application executes at operation 430. The one or more containers that constitute the containerized application may perform any desired task. For example, a containerized application may provide database management operations. The containerized application may proceed with execution until conditions are met that require a sidecar container.

Operation 440 determines whether the sidecar container is required. Based on the configuration of the containerized application, certain tasks may be designated as being performed by the sidecar container rather than a main container. Additionally or alternatively, computing tasks may be selected for offloading to a sidecar container when certain runtime conditions are met, like a container using beyond a threshold amount of processing or memory resources.

If the sidecar container is required, then operation 450 wakes the sidecar container to perform the requested computing task. Otherwise, the containerized application continues to execute at operation 430. Upon resuming execution of the sidecar container, instructions are provided to the sidecar container to cause the sidecar container to perform a requested computing task. In some embodiments, the computing task may include a report generation task in which data is processed to produce a report. For example, the results of processing data may be used to populate a template to output a report. In some embodiments, the computing task includes a backup task, which can include operations such as locating data and copying the data to one or more local or network-accessible storage locations. In some embodiments, the computing task includes a log transfer task, which can involve the transferring of a log's contents from one location to another. In some embodiments, the computing task includes a user-initiated task, including a predefined user-initiated task. Thus, for example, unexpected user behavior, or user-initiated tasks that occur rarely, can automatically wake the sidecar container to ensure that the other containers are not overloaded. In some embodiments, the computing task includes an optimization task, such as identifying and remediating a memory leak, freeing up computing resources, and the like.

Execution of the sidecar container is suspended at operation 460. Once the sidecar container completes the requested computing tasks, the sidecar container may again suspend execution to free up computing resources. The orchestrator of the containerized application may save a state of the sidecar container to a persistent storage so that the sidecar container can resume execution at a later time. At any point during execution, the orchestrator may verify whether the sidecar container is suspended or not based on a liveness probe. The liveness probe may include a heartbeat signal that is periodically transmitted by the sidecar container during execution. Additionally or alternatively, the liveness probe may be implemented by the orchestrator transmitting requests to the sidecar container. For example, the orchestrator can ping the sidecar container based on the container IP address, which may belong to a local subnet that is managed by the pod (as the pod has its own IP address for communication with the orchestrator and other network-accessible entities). In some embodiments, if the liveness probe indicates that the sidecar container is executing when the sidecar container has completed a computing task and therefore should be suspended, the orchestrator may transmit instructions to force the sidecar container to suspend execution.

Operation 470 determines whether the computing job of the containerized application is complete. If the computing job is completed, then the containerized application may terminate. Otherwise, execution of the containerized application continues at operation 430.

Figure 5:
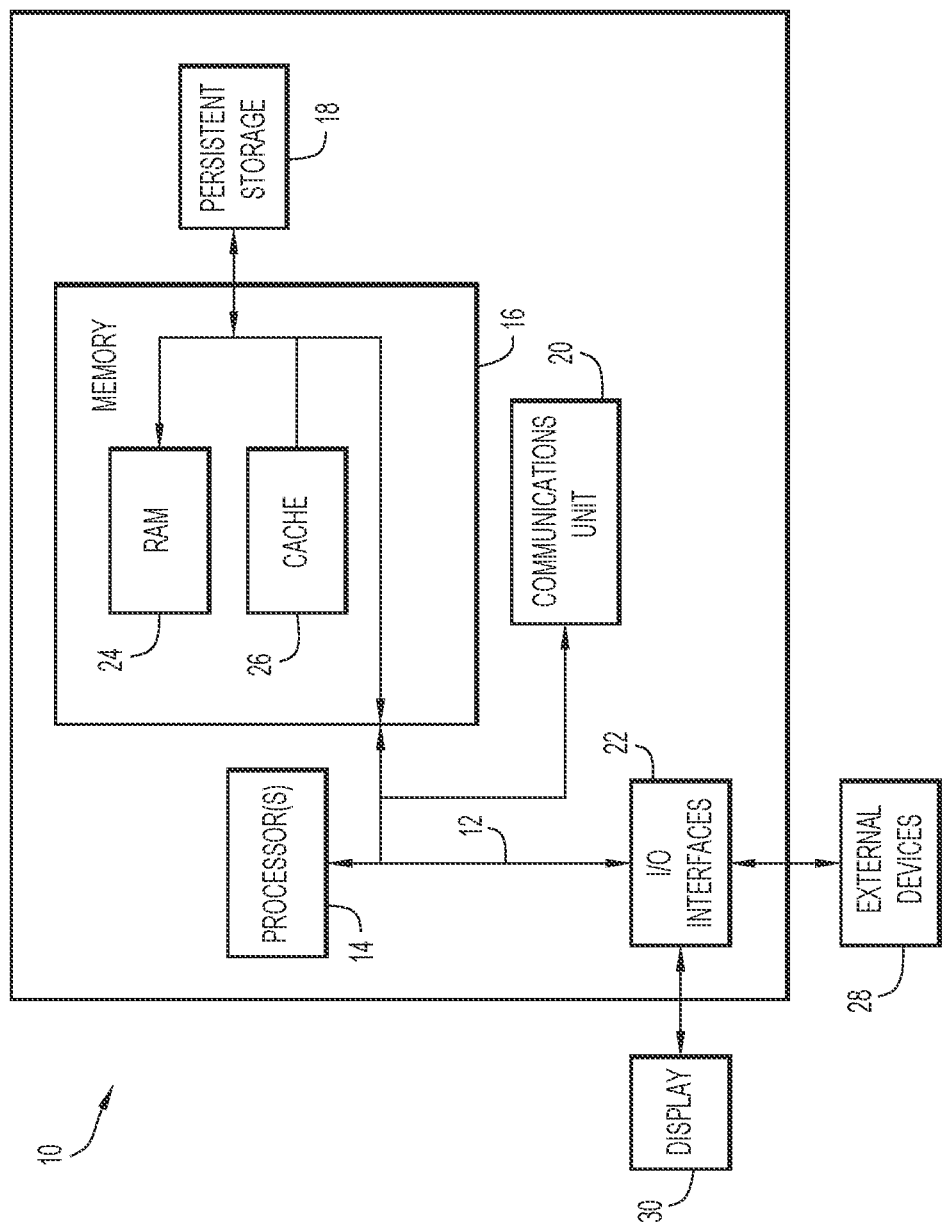
FIG. 5 is a block diagram depicting a computing device in accordance with an embodiment of the present invention.

FIG. 5 is a block diagram depicting components of a computer 10 suitable for executing the methods disclosed herein. Computer 10 may implement client device 105 and/or application server 120 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to dynamic support containers for containerized applications (e.g., image data, pod descriptions (e.g., descriptions of which containers are included in a pod), data stored by, generated by, or otherwise used by containerized applications, state data corresponding to suspended sidecar containers, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105 and/or application server 120 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to dynamic support containers for containerized applications (e.g., image data, pod descriptions (e.g., descriptions of which containers are included in a pod), data stored by, generated by, or otherwise used by containerized applications, state data corresponding to suspended sidecar containers, etc.) may include any information provided to, or generated by, client device 105 and/or application server 120. Data relating to dynamic support containers for containerized applications may include any desired format and arrangement, and may include any quantity of any types of fields of any size to store any desired data. The data relating to dynamic support containers for containerized applications may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to dynamic support containers for containerized applications), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving the performance and efficiency of containerized applications.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, client module 115, orchestrator module 130, pod 135, containers 140A-140N, sidecar container 145, etc.). These systems may include any types of monitors and input devices (e.g., keyboard, mouse, voice recognition, etc.) to enter and/or view information.

It is to be understood that the software (e.g., communications software, server software, client module 115, orchestrator module 130, pod 135, containers 140A-140N, sidecar container 145, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, client module 115, orchestrator module 130, pod 135, containers 140A-140N, sidecar container 145, etc.) may be available on a non-transitory computer usable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to dynamic support containers for containerized applications). The database system may be implemented by any number of any conventional or other databases, data stores or storage structures (e.g., files, databases, data structures, data or other repositories, etc.) to store information (e.g., data relating to dynamic support containers for containerized applications). The database system may be included within or coupled to the server and/or client systems. The database systems and/or storage structures may be remote from or local to the computer or other processing systems, and may store any desired data (e.g., data relating to dynamic support containers for containerized applications).

The present invention embodiments may employ any number of any type of user interface (e.g., Graphical User Interface (GUI), command-line, prompt, etc.) for obtaining or providing information (e.g., data relating to patient monitoring and treatment using implanted biosensors), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, providing improved performance of any cloud computing applications.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for providing dynamic support containers for containerized applications, the computer-implemented method comprising:
    instantiating a pod comprising one or more containers and a sidecar container, wherein execution of the sidecar container is temporarily suspended after the instantiating of the pod;
    determining that a container of the one or more containers is using computing resources beyond a threshold amount;
    resuming the execution of the sidecar container based on:
        the determining that the container is using the computing resources beyond the threshold amount, and
        a first computing task, corresponding to a predefined user-initiated task, of the container;
    providing the sidecar container with first instructions to perform the first computing task of the container;
    transmitting second instructions to suspend the execution of the sidecar container based on determining that the first computing task is complete;
    after the transmitting of the second instructions, determining, based on a liveness probe, that the execution of the sidecar container is active after the completion of the first computing task; and
    transmitting third instructions to suspend the sidecar container based on the determining that the sidecar container is active after the completion of the first computing task.

2. The computer-implemented method of claim 1, wherein the execution of the sidecar container is suspended by saving a state of the sidecar container.

3. The computer-implemented method of claim 1, further comprising reserving an amount of the computing resources, wherein
    the amount of the computing resources is reserved to make the computing resources available to the sidecar container when the execution of the sidecar container is resumed.

4. The computer-implemented method of claim 3, wherein
    the reserved amount of the computing resources is used to perform actions, having a specific priority, while the execution of the sidecar container is suspended, and
    the actions are interrupted when the execution of the sidecar container is resumed.

5. A computer system to provide dynamic support containers for containerized applications, the computer system comprising:
    one or more computer processors;
    one or more computer readable storage media; and
    program instructions stored on the one or more computer readable storage media,
    the program instructions executable by at least one computer processor of the one or more computer processors to cause the at least one computer processor, to:
        instantiate a pod comprising one or more containers and a sidecar container, wherein execution of the sidecar container is temporarily suspended after the instantiation of the pod;
        determine that a container of the one or more containers has utilized computing resources beyond a threshold amount;
        resume the execution of the sidecar container based on:
            the determination that the container has utilized the computing resources beyond the threshold amount, and
            a first computing task, corresponding to a predefined user-initiated task, of the container;
        provide the sidecar container with first instructions to perform the first computing task of the container;
        transmit second instructions to suspend the execution of the sidecar container based on a determination that the first computing task is complete;
        after the transmission of the second instructions, determine, based on a liveness probe, that the execution of the sidecar container is active after the completion of the first computing task; and
        transmit third instructions to suspend the sidecar container based on the determination that the sidecar container is active after the completion of the first computing task.

6. The computer system of claim 5, wherein the execution of the sidecar container is suspended by storing a state of the sidecar container.

7. The computer system of claim 5, wherein
    the program instructions further cause the at least one computer processor to reserve an amount of the computing resources, and
    the amount of the computing resources is reserved to make the computing resources available to the sidecar container when the execution of the sidecar container is resumed.

8. The computer system of claim 7, wherein
    the reserved amount of the computing resources is used to perform actions, having a specific priority, while the execution of the sidecar container suspended, and
    the actions are interrupted when the execution of the sidecar container is resumed.

9. A computer program product to provide dynamic support containers for containerized applications, the computer program product comprising:
    one or more computer readable storage media; and
    program instructions stored on the one or more computer readable storage media, the program instructions executable by a computer to cause the computer to:
        instantiate a pod comprising one or more containers and a sidecar container, wherein execution of the sidecar container is temporarily suspended after the instantiation of the pod;
        determine that a container of the one or more containers is using computing resources beyond a threshold amount;

resume the execution of the sidecar container based on:
- the determination that the container is using the computing resources beyond the threshold amount, and
- a first computing task, corresponding to a predefined user-initiated task, of the container;

provide the sidecar container with first instructions to perform the first computing task of the container;

transmit second instructions to suspend the execution of the sidecar container based on a determination determining that the first computing task is complete;

after the transmission of the second instructions, determine, based on a liveness probe, that the execution of the sidecar container is active after the completion of the first computing task; and transmit third instructions to suspend the sidecar container based on the determination that the sidecar container is active after the completion of the first computing task.

10. The computer program product of claim 9, wherein the execution of the sidecar container is suspended by storing a state of the sidecar container.

11. The computer program product of claim 9, wherein
- the program instructions are further executable by the computer to cause the computer to reserve an amount of the computing resources, and
- the amount of the computing resources is reserved to make the computing resources available to the sidecar container when the execution of the sidecar container is resumed.

12. The computer program product of claim 11, wherein
- the reserved amount of the computing resources is used to perform actions, having a specific priority, while the execution of the sidecar container is suspended, and
- the actions are interrupted when the execution of the sidecar container is resumed.

* * * * *